(12) United States Patent
Lee et al.

(10) Patent No.: US 12,721,764 B2
(45) Date of Patent: Sep. 1, 2026

(54) FACILITATION OF REMOTE ASSISTANCE FOR OCCUPANT IN RESPONSE TO DETECTION OF DISTRESSED VEHICLE LOADING CONDITION

(71) Applicant: GM GLOBAL TECHNOLOGY OPERATIONS LLC, Detroit, MI (US)

(72) Inventors: Jaeyun Lee, Incheon (KR); Bonggoo Jeong, Gyeongido (KR); Sangyoon Keum, Seoul (KR); Gaurav Talwar, Novi, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 527 days.

(21) Appl. No.: 18/347,125

(22) Filed: Jul. 5, 2023

(65) Prior Publication Data

US 2025/0009574 A1 Jan. 9, 2025

(51) Int. Cl.

| | |
|---|---|
| ***A61G 3/02*** | (2006.01) |
| ***A61G 3/06*** | (2006.01) |
| ***A61G 3/08*** | (2006.01) |
| ***B60R 9/042*** | (2006.01) |
| ***B60W 50/14*** | (2020.01) |
| ***G07C 5/08*** | (2006.01) |
| ***G08B 21/02*** | (2006.01) |
| *G08B 25/08* | (2006.01) |
| *H04L 67/12* | (2022.01) |

(52) U.S. Cl.

CPC ............... *A61G 3/02* (2013.01); *A61G 3/062* (2013.01); *A61G 3/0808* (2013.01); *B60R 9/0426* (2013.01); *B60W 50/14* (2013.01); *G07C 5/0808* (2013.01); *G08B 21/02* (2013.01); *B60W 2050/146* (2013.01)

(58) Field of Classification Search

CPC .. A61G 3/02; B60W 50/14; B60W 2050/146; G08B 21/02; G08B 25/08; G07C 5/0808; H04L 67/12

See application file for complete search history.

(56) References Cited

U.S. PATENT DOCUMENTS

| | | | | |
|---|---|---|---|---|
| 7,865,282 | B2 * | 1/2011 | Murlidar | G08G 1/0962 455/569.1 |
| 10,096,234 | B1 * | 10/2018 | Chun | G10L 15/063 |
| 10,624,802 | B2 * | 4/2020 | Lacaze | E05F 15/73 |

(Continued)

FOREIGN PATENT DOCUMENTS

| | | | | |
|---|---|---|---|---|
| CN | 112819586 A | * | 5/2021 | G06Q 30/0635 |

OTHER PUBLICATIONS

CN-112819586-A (Year: 2021).*

*Primary Examiner* — Ernesto A Suarez
*Assistant Examiner* — Laurence R Brothers
(74) *Attorney, Agent, or Firm* — Quinn IP Law

(57) ABSTRACT

Herein, a technology is discussed that facilitates remote assistance for an occupant of a vehicle in response to the detection of distressed vehicle loading conditions during a power-assisted loading of cargo into the vehicle. The technology and techniques described herein detect a distressed condition that occurs during a power-assisted loading of cargo into a vehicle. In response to the detected condition, the technology and techniques notify a remote communications center and facilitate the assistance of an occupant in cooperation with that center.

20 Claims, 3 Drawing Sheets

(56) References Cited

U.S. PATENT DOCUMENTS

2005/0264425 A1* 12/2005 Sato ...................... G08B 31/00 340/506
2006/0244313 A1* 11/2006 Sullivan .................... B60J 1/17 307/9.1

* cited by examiner

FACILITATION OF REMOTE ASSISTANCE FOR OCCUPANT IN RESPONSE TO DETECTION OF DISTRESSED VEHICLE LOADING CONDITION

INTRODUCTION

To improve accessibility and convenience for wheelchair users, some vehicles have power-assisted loading systems, which include motorized components that aid in loading and securing the wheelchair. Such systems often include motorized lifts, automated ramps, and/or robotic arms.

SUMMARY

According to one embodiment, a method that includes monitoring a power-assisted loading of cargo into a vehicle, wherein the monitoring includes measuring a duration of multiple stages of the loading; detecting a distressed condition of one or more of the multiple stages of the loading; in response to the detected distressed condition, notifying a remote communications center of the detection of the distressed condition; and facilitating assistance of the occupant of the vehicle regarding the detection of the distressed condition.

In this embodiment of the method, the method further includes associating a triggering threshold of duration with each of the multiple stages of the loading; and the detecting of the distressed condition includes: comparing a duration of one or more loading stages to their associated triggering threshold; determining that the duration of at least one of the loading stages exceeds its associated triggering threshold; and, in response to the determination that the duration of at least one of the loading stages exceeds its associated triggering threshold, indicating that a distressed condition exists.

With this embodiment of the method, wherein the monitoring further includes listening to loading-proximate ambient audio during one or more loading stages and/or visually observing a loading-proximate area during one or more loading stages.

With this embodiment, wherein the detecting of the distressed condition includes: recognizing one or more sounds of distress; and, in response to the recognition of one or more sounds of distress, indicating that a distressed condition exists.

In this embodiment of the method wherein one or more sounds of distress are selected from a group consisting of a human voice requesting assistance, a human voice expressing pain or distress, a sound of a malfunctioning mechanism, and a repetitive, high-pitched, or loud volume utterance from a human.

In this embodiment of the method wherein the detecting of the distressed condition includes: recognizing one or more visual signs of distress; and in response to the recognition of one or more visual signs of distress, indicating that a distressed condition exists.

In this embodiment of the method wherein one or more visual signs of distress are selected from a group consisting of a human expressing pain or distress, a visual of a malfunctioning mechanism, a rapid and repetitive motion, pounding on the vehicle, and shaking of the vehicle.

In this embodiment of the method further includes, in response to the notification, receiving a message from the remote communications center and delivering the message to an occupant of the vehicle.

In this embodiment of the method, wherein the facilitating assistance of the occupant includes actions selected from a group consisting of performing diagnostics, interrogating the occupant, troubleshooting malfunctioning mechanism, contacting nearby human assistance, contacting emergency services, directions to reset components of the vehicle, directions to reset the vehicle, sounding alarms, flashing lights, and broadcasting a distress message.

According to yet another embodiment, a non-transitory machine-readable storage medium encoded with instructions executable by one or more processors that, when executed, direct one or more processors to perform operations that include monitoring a power-assisted loading of cargo into a vehicle, wherein the monitoring includes measuring a duration of multiple stages of the loading; detecting a distressed condition of one or more of the multiple stages of the loading; in response to the detected distressed condition, notifying a remote communications center of the detection of the distressed condition; in response to the notification, receiving a message from the remote communications center and delivering the message to an occupant of the vehicle; and facilitating assistance of the occupant of the vehicle regarding the detection of the distressed condition.

Another non-transitory machine-readable storage medium embodiment that includes additional operation: associating a triggering threshold of duration with each of the multiple stages of the loading, wherein the detecting of the distressed condition includes: comparing a duration of one or more loading stages to their associated triggering threshold; determining that the duration of at least one of the loading stages exceeds its associated triggering threshold; and, in response to the determination that the duration of at least one of the loading stages exceeds its associated triggering threshold, indicating that a distressed condition exists.

Another non-transitory machine-readable storage medium embodiment in which the monitoring further includes listening to loading-proximate ambient audio during one or more loading stages and/or visually observing a loading-proximate area during one or more loading stages.

Another non-transitory machine-readable storage medium embodiment in which the message received from the remote communication center is selected from a group consisting of a short message service communication, an electronic data communication, an audio voice communication, and telephony communication.

Another non-transitory machine-readable storage medium embodiment in which the facilitating assistance of the occupant includes actions selected from a group consisting of performing diagnostics, interrogating the occupant, troubleshooting malfunctioning mechanism, contacting nearby human assistance, contacting emergency services, directions to reset components of the vehicle, directions to reset the vehicle, sounding alarms, flashing lights, and broadcasting a distress message.

According to yet another embodiment, a method that facilitates remote assistance for an occupant of a vehicle in response to the detection of distressed vehicle loading conditions during a power-assisted loading of cargo into the vehicle, the method includes monitoring a power-assisted loading of cargo into a vehicle, wherein the monitoring includes measuring a duration of multiple stages of the loading; associating a triggering threshold of duration with each of the multiple stages of the loading; detecting a distressed condition of one or more of the multiple stages of the loading; in response to the detected distressed condition, notifying a remote communications center of the detection of the distressed condition; in response to the notification, receiving a message from the remote communications center and delivering the message to an occupant of the vehicle; and facilitating assistance of the occupant of the vehicle regarding the detection of the distressed condition.

Another embodiment of the method, wherein the detecting of the distressed condition includes: comparing a duration of one or more loading stages to their associated triggering threshold; determining that the duration of at least one of the loading stages exceeds its associated triggering threshold; and, in response to the determination that the duration of at least one of the loading stages exceeds its associated triggering threshold, indicating that a distressed condition exists.

Another embodiment of the method, wherein the monitoring further includes listening to loading-proximate ambient audio during one or more loading stages and one or more sounds of distress is selected from a group consisting of a human voice requesting assistance, a human voice expressing pain or distress, a sound of a malfunctioning mechanism, and a repetitive, high-pitched, or loud volume utterance from a human.

Another embodiment of the method wherein the monitoring further includes visually observing a loading-proximate area during one or more loading stages and one or more visual signs of distress is selected from a group consisting of a human expressing pain or distress, a visual of a malfunctioning mechanism, a rapid and repetitive motion, pounding on the vehicle, and shaking of the vehicle.

Another embodiment of the method wherein the message received from the remote communication center is selected from a group consisting of a short message service communication, an electronic data communication, an audio voice communication, and telephony communication.

Another embodiment of the method wherein the facilitating assistance of the occupant includes actions selected from a group consisting of performing diagnostics, interrogating the occupant, troubleshooting malfunctioning mechanism, contacting nearby human assistance, contacting emergency services, directions to reset components of the vehicle, direction to reset the vehicle, sounding alarms, flashing lights, and broadcasting a distress message.

The above features and advantages, and other features and advantages of the present teachings are readily apparent from the following detailed description of some of the best modes and other embodiments for carrying out the present teachings, as defined in the appended claims when taken in connection with the accompanying drawings.

DETAILED DESCRIPTION

Figure 1:
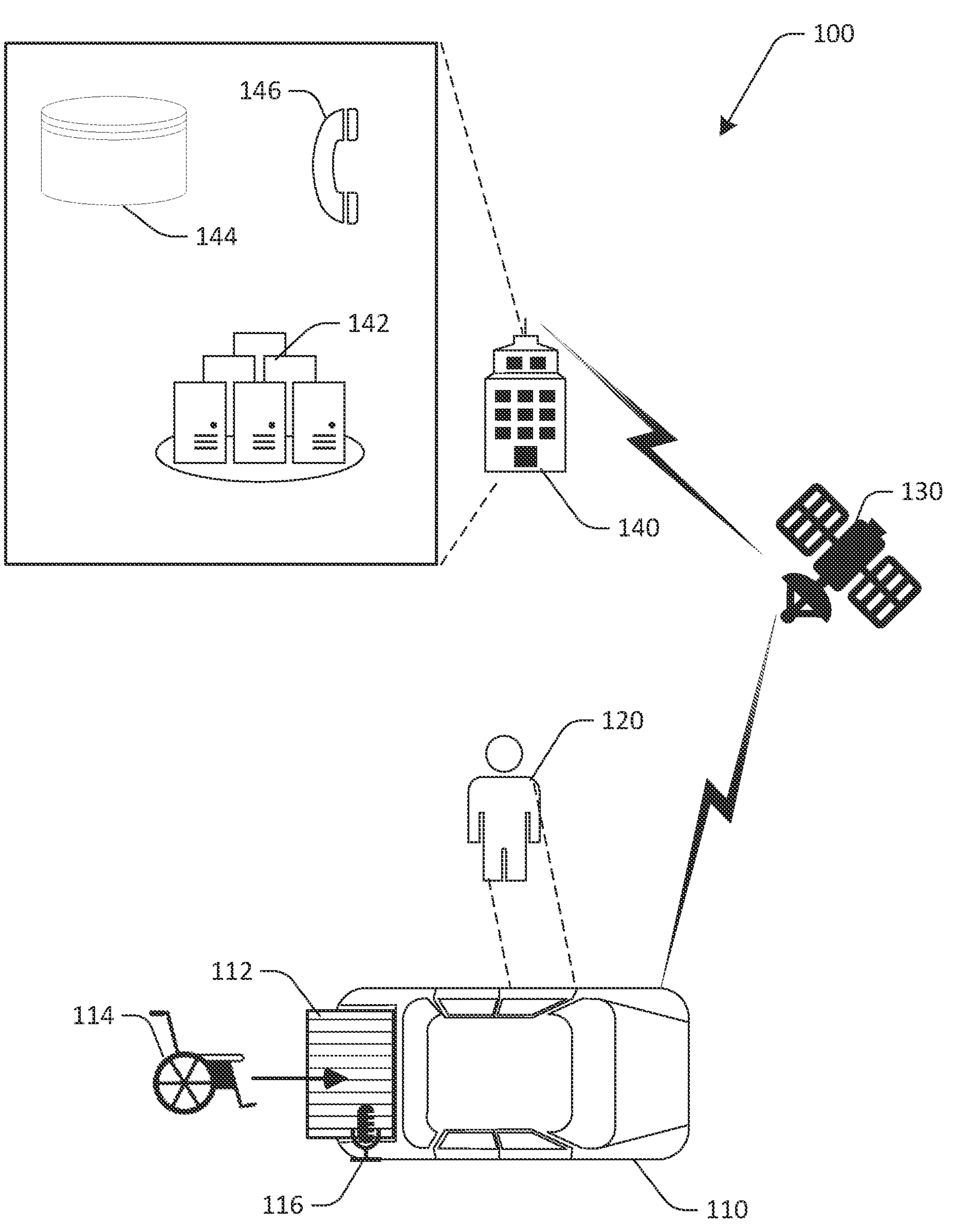
FIG. 1 illustrates an example scenario of an example vehicle with a power-assisted loading system and employs one or more implementations of the technology described herein.

The technology described herein facilitates remote assistance for an occupant of a vehicle in response to the detection of distressed vehicle loading conditions during a power-assisted loading of cargo into the vehicle. The technology and techniques described herein detect a distressed condition that occurs during a power-assisted loading of cargo into a vehicle. In response to the detected condition, the technology and techniques notify a remote communications center and facilitate the assistance of an occupant in cooperation with that center.

Referring now to the drawings, wherein like numerals indicate like parts in the several views of various systems and approaches are shown and described herein. Disclosed approaches may be suitable for use with automotive vehicles, which include manual, autonomous, and semi-autonomous driving.

FIG. 1 illustrates an example scenario 100 that includes an automotive vehicle 110, a satellite 130, and a remote communications ("comm") center 140, which are suitable for the implementation of the technology described herein.

Vehicle 110 includes a power-assisted loading system 112 configured to automate or semi-automate cargo loading into the vehicle. In this example, the cargo is a wheelchair 114. Vehicle 110 monitors the power-assisted loading of cargo (e.g., the wheelchair 114) into the vehicle using the power-assisted loading system 112. The process of loading cargo into vehicle 110 includes multiple stages.

An example scenario of a cargo loading process may involve a wheelchair user, such as occupant 120. Occupant 120 may exit their wheelchair 114 and enter vehicle 110 using the driver's door. Once in vehicle 110, the occupant starts the vehicle and initiates the cargo loading process of the power-assisted loading system 112.

In this example scenario, wheelchair 114 may be collapsible and capable of being relocated to a to-be-loaded position outside vehicle 110. As depicted, this position is at the rear of the vehicle because that is where the power-assisted loading system 112 is located in vehicle 110. The Wheelchair 114 may be motorized so that it may be relocated under its own locomotion. Also, relocating wheelchair 114 may be directed in an automated, semi-automated, or remotely controlled manner.

With the wheelchair 114 relocated to the to-be-loaded position, in this example scenario, the tailgate of the vehicle opens, a flat sliding panel of the power-assisted loading system 112 slides out, and a scissor lift lowers to the ground. Wheelchair 114 is moved onto the scissor lift, and the lift raises the wheelchair. The flat sliding panel retracts into vehicle 110, and the tailgate closes. This completes the cargo loading process in this example scenario.

The power-assisted loading system 112 includes, for example, the tailgate, the flat sliding panel, and the scissor lift. In other implementations, the power-assisted loading system 112 may include other or different power-assisted mechanisms that perform movements that assist in cargo loading. In this scenario, there may be multiple stages of the loading process, such as 1) opening the tailgate; 2) panel slides out; 3) lowering of the scissor lift; 4) raising of the scissor lift; 5) retraction of the panel; and 6) close of the tailgate.

Vehicle 110 measures the duration of each of the multiple stages of the loading. For example, vehicle 110 may measure the time it takes for the open-tailgate stage to complete. This could be, for example, twenty seconds.

Vehicle 110 associates a triggering threshold of duration with each of the multiple stages of the loading. The triggering threshold for a particular stage may be, for example, a maximum time expected for that stage to take to complete successfully. For example, the opening-tailgate stage's triggering threshold may be ninety seconds. In other words, the open-tailgate stage is expected to take more than 90 seconds in exceptional situations, such as a mechanical malfunction.

The triggering threshold for each stage may be factory set. That is, the manufacturer or dealer sets the threshold. The thresholds may be adjustable. In some instances, the user may be able to adjust the thresholds manually. In some other instances, vehicle 110 may programmatically adjust the thresholds. For example, vehicle 110 may adjust the thresholds based on a statistical relationship with real-world uses, such as three times that stage's average time of operation. In still other instances, the threshold may be set by the comm center 140.

Vehicle 110 detects a distressed condition of one or more of the multiple stages of the loading. As used herein, unless the context indicates otherwise, a distressed condition of a stage occurs during that stage.

A distressed condition includes a malfunctioning mechanism of machinery (e.g., the power-assisted loading system 112), an unsuccessful loading process, an impediment to the loading process, distress to an occupant, or a situation where assistance is likely to aid or hasten the completion of the loading process.

The detection of a distressed condition may include vehicle 110 comparing a measured duration of one or more loading stages to their associated triggering threshold. Based on that comparison, vehicle 110 determines that the duration of at least one of the loading stages exceeds its associated triggering threshold. That is, at least one of the loading stages did not complete its operation within its associated triggering threshold time period. In response, vehicle 110 indicates a distressed condition related to that stage exists.

Other factors affecting the detection of a distressed condition include, for example, sensors that indicate whether a door or mechanism is open (e.g., ajar) and the status of switches (e.g., power lift gate switch).

As depicted, vehicle 110 has audio/visual devices 116 located near the power-assisted loading system 112. The audio/visual devices 116 may include a camera for visual observation of and a microphone for listening to the operation of the power-assisted loading system 112.

The camera is mounted to visually observe a loading-proximate area during one or more loading stages. The loading-proximate area includes the power-assisted loading system 112 itself, the space in which the system moves through, and the space immediately around the system. In some instances, the space immediately around the power-assisted loading system 112 may be as small as three inches. In other instances, it may be as little as a foot or perhaps a few feet. In some instances, the camera may visually observe an occupant therein vehicle 110.

In observing the loading-proximate area, the camera may observe the operation of the power-assisted loading system 112 during the operation of one or more loading stages. In addition, the camera may observe the behavior of an occupant therein vehicle 110.

Using the camera, vehicle 110 may detect a distressed condition by recognizing one or more visual signs of distress and, in response, indicate that a distressed condition exists. Examples of visual signs of distress include a human expressing pain or distress, a visual of a malfunctioning mechanism, a rapid and repetitive motion, pounding on the vehicle, and shaking of the vehicle.

The microphone is mounted to listen to loading-proximate ambient audio during one or more loading stages. The loading-proximate ambient audio includes sounds produced by the power-assisted loading system 112 itself or an occupant in the vehicle. While monitoring the power-assisted loading of cargo, vehicle 110 may listen to loading-proximate ambient audio during one or more loading stages.

Using the microphone, vehicle 110 may detect a distressed condition by recognizing one or more sounds of distress and, in response, indicate that a distressed condition exists. Examples of sounds of distress include one or more of the following: a human voice requesting assistance, a human voice expressing pain or distress, a sound of a malfunctioning mechanism, and a repetitive, high-pitched, or loud volume utterance from a human.

The recognition of the visual signs of distress and the sounds of distress may be accomplished using various techniques to compare real-world audio/image data with signs/sounds of distress. In some instances, this may be accomplished using one or more of these techniques: Feature detection and matching to extract distinctive features to find correspondences; template matching; deep learning-based methods using pre-trained Convolutional Neural Networks (CNN) models; histogram-based methods; and Structural Similarity Index (SSIM).

Vehicle 110, in response to the detected distressed condition, notifies the comm center 140 of the detection of the distressed condition via wireless communications. This wireless communication may include, for example, one or more of the following: satellite communications (as depicted by satellite 130), WI-FI™, BLUETOOTH™, cellular communications, radio communications, and/or Internet communications.

The comm center 140 includes one or more computing systems 142, one or more databases 144, and a staffed call center 146. While shown as one location in FIG. 1, the components and functionality of the comm center 140 may be distributed geographically and across multiple comm centers. The comm center 140 is remote from vehicle 110 in that the comm center 140 is physically and geographically separate from and unconnected to vehicle 110.

Vehicle 110, in response to the notification, receives a message (i.e., communication) from the comm center 140. The message received from the comm center 140 may include, for example, a short message service communication (i.e., a "text message"), an electronic data communication, an audio voice communication, and telephony communication. Vehicle 110 delivers that message to occupant 120 of the vehicle. Occupant 120 may be an occupant of vehicle 110. In some instances, occupant 120 may be the driver or non-driver of the vehicle.

Vehicle 110 facilitates the assistance of occupant 120 of the vehicle regarding the detection of the distressed condition. Herein, vehicle 110 facilitates assistance by performing an assistive action itself, being a mechanism of interaction between the comm center 140 and the occupant 120, or a combination of both. Examples of ways in which vehicle 110 facilitates assistance of the occupant include performing diagnostics, interrogating the occupant, troubleshooting malfunctioning mechanism, contacting nearby human assistance, contacting emergency services (i.e., "calling 911"), and direction to reset components of the vehicle, direction to reset the vehicle, sounding alarms, flashing lights, and broadcasting a distress message.

Figure 2:
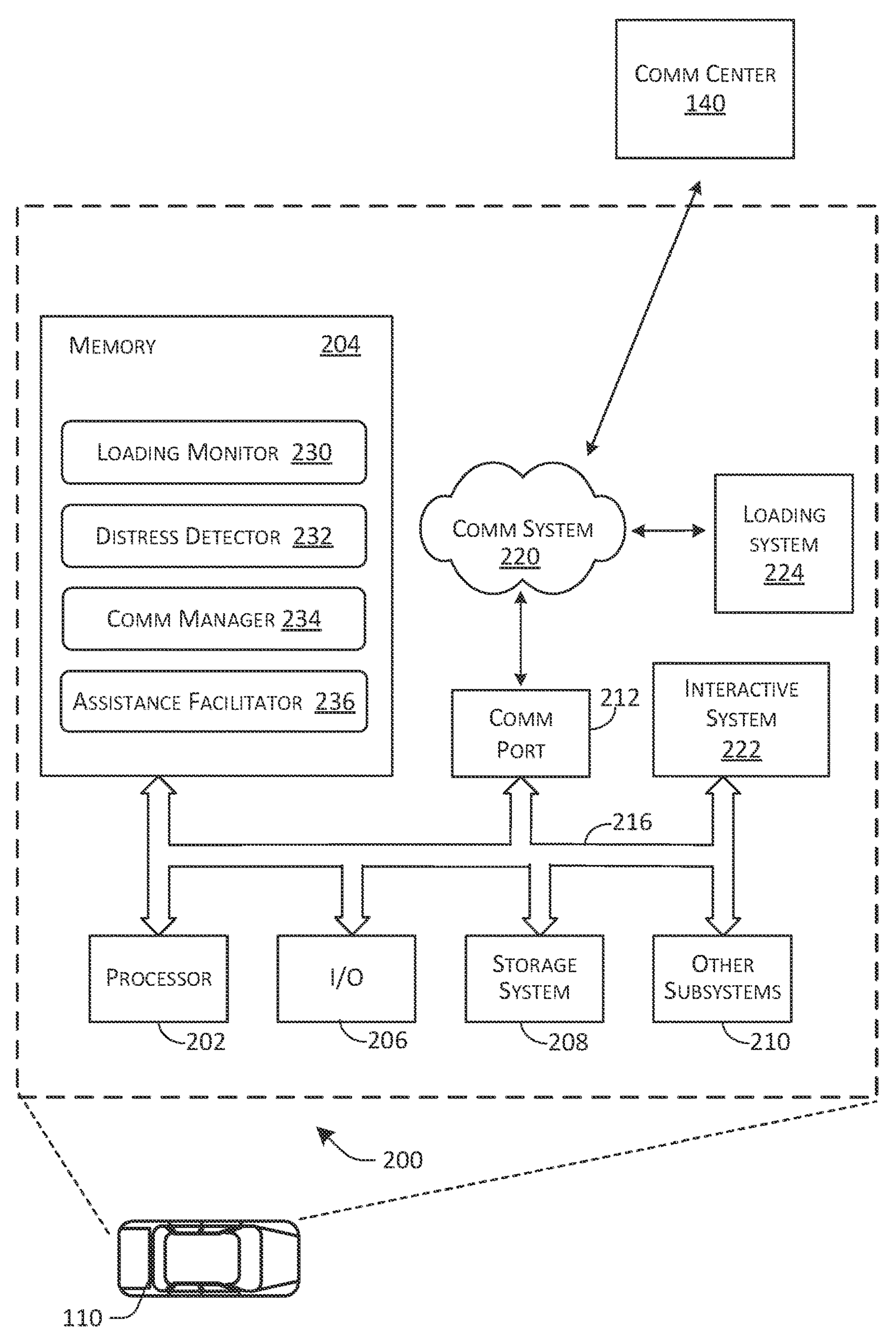
FIG. 2 illustrates an example of computer architecture for a computing system capable of executing the technology described herein.

FIG. 2 illustrates an example of computer architecture for a computing system 200 capable of executing the technology described herein. The computer architecture shown in this figure illustrates a typical computer, server computer, workstation, desktop computer, laptop, tablet, network appliance, e-reader, smartphone, embedded system, or another computing device. Computer system 200 may be part of vehicle 110 and can be utilized to execute the functionalities presented herein.

The computing system 200 includes a processor 202 (e.g., central processor unit or "CPU"), system storage (e.g., memory) 204, input/output (I/O) devices 206—such as a display, a keyboard, a mouse, a microphone, a camera, and associated controllers, a secondary storage system 208 (e.g., a hard drive), and various other subsystems 210. In various embodiments, the computing system 200 also includes a communications ("comm") port 212, operable to connect to a communications ("comm") system 220. The computing system 200 may include or be connected to an occupant interactive system 222, which manages interactions with the occupants of vehicle 110. The foregoing components may be interconnected via one or more buses 216 and/or comm system 220.

The comm system 220 enables internal communications within vehicle 110 and external wireless communications, such as with the comm center 140. Internal communication may be, for example, via a local area network. The external wireless communication may include, for example, one or more of the following: satellite communications (as depicted by satellite 130 in FIG. 1), WI-FI™, BLUETOOTH™, cellular communications, radio communications, and/or Internet communications.

A power-assisted cargo loading system 224 is a machinery of vehicle 110 that automatically or semi-automatically loads cargo into the vehicle. The cargo may be a wheelchair, like wheelchair 114 depicted in FIG. 1. Like the power-assisted loading system 112 of FIG. 1, the power-assisted cargo loading system 224 may include, for example, a tailgate, a flat sliding panel, and a scissor lift. In other implementations, the power-assisted loading system 112 may include other or different power-assisted mechanisms that perform movements that assist in cargo loading. The power-assisted cargo loading system 224 performs the cargo loading in multiple stages, such as: 1) opening the tailgate; 2) panel slides out; 3) lowering of the scissor lift; 4) raising of the scissor lift; 5) retraction of the panel; and 6) close of the tailgate.

System memory 204 may store data and machine-readable instructions (e.g., computer-readable instructions). Machine-readable instructions may configure the computing system 200. Machine-readable instructions may include one or more instruction modules. The instruction modules may include computer program modules. The instruction modules may include one or more of a loading monitor 230, a distress detector 232, a communications ("comm") manager 234, an assistance facilitator 236, and/or other instruction-based modules.

While the modules in the example depicted by this figure are implemented using machine-readable instructions, other similarly functioning modules may be implemented using little to no machine-readable instructions. That is, such modules are implemented via hardware (e.g., circuitry) and analog and/or digital signals. In other instances, such modules may be implemented via a combination of hardware and machine-implemented instructions.

The loading monitor 230 may be configured to monitor the power-assisted loading of cargo into vehicle 110 using the power-assisted loading system 224. The process of loading cargo into vehicle 110 includes multiple stages. As part of the monitoring, the loading monitor 230 may be configured to measure a duration of each of the multiple stages of the loading. For example, the loading monitor 230 may measure the time it takes for an open-tailgate stage to complete. This could be, for example, twenty seconds.

The distress detector 232 may be configured to detect a distressed condition of one or more of the multiple stages of the loading. A distressed condition includes, for example, a malfunctioning mechanism of machinery (e.g., the power-assisted loading system 224), an unsuccessful loading process, an impediment to the loading process, distress to an occupant, or a situation where assistance is likely to aid or hasten the completion of the loading process.

In addition, the distress detector 232 may be configured to associate a triggering threshold of duration with each of the multiple stages of the loading. The triggering threshold for a particular stage may be, for example, a maximum time expected for that stage to take to complete successfully. For example, the opening-tailgate stage's triggering threshold may be ninety seconds. In other words, the open-tailgate stage is expected to take more than 90 seconds in exceptional situations, such as a mechanical malfunction.

As part of the detection of a distressed condition, the distress detector 232 may be configured to compare a measured duration of one or more loading stages to their associated triggering threshold. Based on that comparison, the distress detector 232 may be configured to determine that the duration of at least one of the loading stages exceeds its associated triggering threshold. That is, at least one of the loading stages did not complete its operation within its associated triggering threshold time period. In response, the distress detector 232 may be configured to indicate that a distressed condition exists related to that stage.

In other implementations, the distress detector 232 may be configured to detect a distressed condition based on a camera for visual observation and a microphone for listening to the power-assisted loading system 224 operations. The camera and microphone may be part of the I/O devices 206.

The camera is mounted to visually observe a loading-proximate area during one or more loading stages. In observing the loading-proximate area, the camera may observe the operation of the power-assisted loading system 224 during the operation of one or more loading stages. In addition, the camera may be able to observe the behavior of an occupant therein vehicle 110. Using the camera, the distress detector 232 may be configured to detect a distressed condition by recognizing one or more visual signs of distress and, in response, indicate that a distressed condition exists.

The microphone is mounted to listen to loading-proximate ambient audio during one or more loading stages. The loading-proximate ambient audio includes sounds produced by the power-assisted loading system 112 itself or an occupant in the vehicle. While monitoring the power-assisted loading of cargo, vehicle 110 may listen to loading-proximate ambient audio during one or more loading stages. Using the microphone, the distress detector 232 may be configured to detect a distressed condition by recognizing one or more sounds of distress and, in response, indicate that a distressed condition exists.

The comm manager 234 may be configured to notify the comm center 140 of the detection of the distressed condition via wireless communications. This notification may include data related to the distressed condition that was detected. For example, the notification may include associated error conditions of the loading system 224, detected associated sounds, and visuals.

The comm manager 234 may be further configured to receive a message (i.e., communication) from the comm center 140. The message received from the comm center 140 may include, for example, a short message service communication (i.e., a "text message"), an electronic data communication, an audio voice communication, telephony communication, and the like.

The assistance facilitator 236 may be configured to deliver that message to the occupant of vehicle 110. That occupant may be an occupant of vehicle 110. In some instances, the occupant may be the driver or non-driver of the vehicle. The assistance facilitator 236 may be further configured to provide additional assistance to the occupant of vehicle 110 regarding the detection of the distressed condition. Herein, the assistance facilitator 236 may be configured to facilitate assistance by performing an assistive action itself, being a mechanism of interaction between the comm center 140 and the occupant, or a combination of both.

The functionality of these example modules depicted by this figure may be organized differently. For example, the functionality of these example models may be distributed across various commonly implemented on-board automotive systems, such as Body Control Module (BCM), telematics units (TCP), infotainment control unit (VCU), vehicle displays (VCD), and power liftgate unit (PTM).

The BCM is an electronic control unit in a vehicle that manages and controls various electrical and electronic functions within the vehicle's body. Typically, it controls systems such as lighting, power windows, central locking, wipers, climate control, audio systems, instrument clusters, and security systems. Typically, the BCM receives input from sensors and switches and sends commands to the corresponding components or systems, ensuring the proper functioning of these features in the vehicle.

For example, herein, the BCM may perform operations related to the loading monitor 230 and the distress detector 232.

The TCP is an electronic device found in vehicles that combines telecommunications and information technology. It may collect and communicate data related to the vehicle's performance, location, and driver behavior. Typically, the TCP uses global positioning system (GPS) or other positioning systems for vehicle tracking and location services, enables communication and connectivity through cellular or satellite networks, provides vehicle diagnostics and maintenance information, incorporates security features, monitors driver behavior, and allows for connected services and applications. TCP enhances vehicle functionality, enables data-driven insights, and improves efficiency in areas such as fleet management, vehicle tracking, and connected car services.

For example, herein, the TCP may perform operations related to the comm manager 234 and assistance facilitator 236.

The VCU is an electronic device in vehicles that combines entertainment and information features into a single interface. Typically, it serves as a centralized control hub for various multimedia and communication functions. The VCU typically consists of hardware, such as a display screen and control buttons or a touchscreen, along with software that enables access to entertainment options, navigation systems, communication features, and vehicle settings. It provides features such as audio and video playback, BLUETOOTH connectivity for hands-free calling and music streaming, integration with smartphone applications, GPS navigation, and access to vehicle settings and information.

For example, herein, the VCU may perform operations related to the loading monitor 230 and the distress detector 232.

The VCD refers to the interface or screen in a vehicle that displays information and allows the driver to control various vehicle functions. It can include digital instrument clusters, infotainment screens, or dedicated control panels. The display provides vehicle data like speed, fuel level, and warnings and allows the driver to interact with features such as audio, navigation, climate control, vehicle settings, and diagnostics. The specific design and features of the VCD can vary between vehicles, but its purpose is to provide a user-friendly interface for monitoring and managing vehicle functions.

For example, the VCD and VCU may work together to acquire and present audio and video data to/from the I/O devices 206.

The PTM is an electronic component found in vehicles with a power liftgate feature. Typically, the PTM controls the liftgate's opening, closing, and adjustment using electric motors. The PTM receives signals from switches and sensors, ensuring safe operation and obstacle detection.

For example, herein, the PTM may perform operations related to the power-assisted loading system 224.

Figure 3:
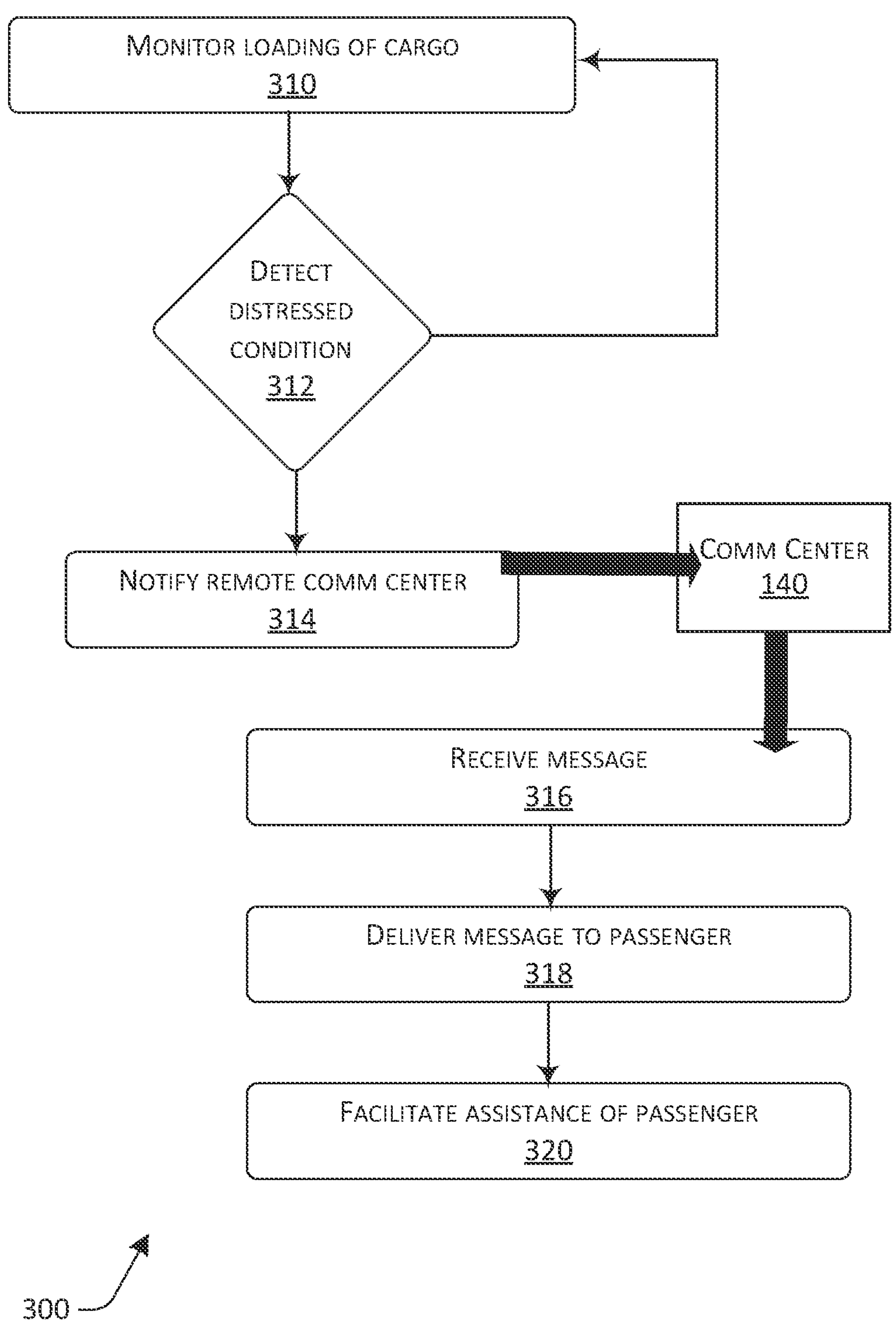
FIG. 3 is a flowchart illustrating a process to perform an example method that facilitates remote assistance for an occupant in response to the detection of distressed vehicle loading conditions, in accordance with one or more implementations described herein.

FIG. 3 is a flowchart that illustrates a process 300 to perform an example method that facilitates remote assistance for an occupant of a vehicle in response to the detection of distressed vehicle loading conditions during a power-assisted loading of cargo into the vehicle. For ease of illustration, process 300 may be described as being performed by a system described herein. Such a system may be, for example, vehicle 110 or the computing system 200, as described herein. However, process 300 may be performed by other devices or a combination of devices and systems.

At operation 310, the system monitors the power-assisted loading of cargo into a vehicle (e.g., vehicle 110) using a power-assisted loading system (e.g., system 112 or system 224). The process of loading cargo into the vehicle includes multiple stages. As part of the monitoring, the system may measure the duration of each of the multiple stages of the loading. For example, the system may measure the time it takes for an open-tailgate stage to complete. This could be, for example, twenty seconds.

At operation 312, the system detects a distressed condition of one or more of the multiple stages of the loading. A distressed condition includes, for example, a malfunctioning mechanism of machinery (e.g., the power-assisted loading system 224), an unsuccessful loading process, an impediment to the loading process, distress to an occupant, or a situation where assistance is likely to aid or hasten the completion of the loading process.

In addition, the system may associate a triggering threshold of duration with each of the multiple stages of the loading. The triggering threshold for a particular stage may be, for example, a maximum time expected for that stage to take to complete successfully. For example, the opening-tailgate stage's triggering threshold may be ninety seconds. In other words, the open-tailgate stage is expected to take more than 90 seconds in exceptional situations, such as a mechanical malfunction.

As part of the detection of a distressed condition, the system may compare a measured duration of one or more loading stages to their associated triggering threshold. Based on that comparison, the system may determine that the duration of at least one of the loading stages exceeds its associated triggering threshold. In response, the system may indicate that a distressed condition exists related to that stage.

In other implementations, the system may detect a distressed condition based on a camera for visual observation of and a microphone for listening to the operation of the power-assisted loading system. In observing a loading-proximate area, the camera may observe the operation of the power-assisted loading system during the operation of one or more loading stages. In addition, the camera may be able to observe the behavior of an occupant therein the vehicle. Using the camera, the system may detect a distressed condition by recognizing one or more visual signs of distress and, in response, indicate that a distressed condition exists.

In listening to loading-proximate ambient audio, the microphone may hear the operation of the power-assisted loading system during the operation of one or more loading stages. The loading-proximate ambient audio includes sounds produced by the power-assisted loading system itself or an occupant in the vehicle. Using the microphone, the system may detect a distressed condition by recognizing one or more sounds of distress and, in response, indicate that a distressed condition exists.

At operation 314, the system notifies the comm center 140 of the detection of the distressed condition via wireless communications. This notification may include data related to the distressed condition that was detected. For example, the notification may include associated error conditions of the loading system, detected associated sounds, and visuals. In response, the comm center 140 may return a message (i.e., communication) to the vehicle.

At operation 316, the system receives the message from the comm center 140. The message received from the comm center 140 may include, for example, a short message service communication (i.e., a "text message"), an electronic data communication, an audio voice communication, telephony communication, and the like.

At operation 318, the system delivers that message to the occupant of the vehicle. The form of the delivery may be text, data, images, video, and/or audio. The audio/visual message may be a live interaction with a staffer at the comm center 140. The occupant may be an occupant of the vehicle. In some instances, the occupant may be the driver or non-driver of the vehicle.

At operation 320, the system provides additional assistance to the occupant of the vehicle regarding the detection of the distressed condition. Herein, the system may facilitate assistance by performing an assistive action itself, being a conduit of interaction between the comm center 140 and the occupant, or a combination of both.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels and are not intended to impose numerical or positional requirements on their objects. As used herein, an element or step recited in the singular and preceded by the word "a" or "an" should be understood as not excluding the plural of such elements or steps, unless such exclusion is explicitly stated. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "mostly", "mainly", "for the most part", "to a significant extent", "to a large degree" and/or "at least 51% to 99% out of a possible extent of 100%", and do not necessarily mean "perfectly", "completely", "strictly", "entirely" or "100%". Additionally, the word "proximate" may be used herein to describe the location of an object or portion thereof concerning another object or portion thereof, and/or to describe the positional relationship of two objects or their respective portions thereof concerning each other, and may mean "near", "adjacent", "close to", "close by", "at" or the like. And, the phrase "approximately equal to" as used herein may mean one or more of "exactly equal to", "nearly equal to", "equal to somewhere between 90% and 110% of" or the like.

This written description uses examples, including the best mode, to enable those skilled in the art to make and use devices, systems, and compositions of matter, and to perform methods, according to this disclosure. It is the following claims, including equivalents, which define the scope of the present disclosure.

What is claimed is:

1. A method of loading cargo comprising:

loading the cargo with a power-assisted loading system from a to-be-loaded position outside a vehicle to inside the vehicle, wherein the vehicle includes a powered tailgate, and the power-assisted loading system includes a flat sliding panel and a scissor lift;

monitoring the loading of the cargo into the vehicle with a plurality of sensors coupled to a computer, wherein:

the monitoring includes measuring multiple durations of multiple stages of the loading; and the multiple stages include opening the powered tailgate, moving the flat sliding panel outward from the vehicle, lowering the scissor lift, capturing the cargo in the scissor lift, raising the cargo with scissor lift, retracting the flat sliding panel into the vehicle, and closing the powered tailgate;

detecting a distressed condition during one or more of the multiple stages of the power-assisted loading system with the computer;

in response to the detecting of the distressed condition, notifying automatically a remote communications center remote from the vehicle of the detection of the distressed condition;

receiving a message from the remote communications center in response to the notifying; and facilitating troubleshooting of the power-assisted loading system with the computer based on the message.

2. The method of claim 1 further comprising:

associating a triggering threshold of duration with each of the multiple stages of the loading, wherein the detecting of the distressed condition includes:

comparing the multiple durations of the multiple stages of the loading to their associated triggering threshold of duration;

determining that the duration of at least one of the multiple stages of the loading exceeds its associated triggering threshold of duration; and in response to the determination that the duration of the at least one of the multiple stages of loading exceeds its associated triggering threshold of duration, indicating that the distressed condition exists.

3. The method of claim 1, wherein the monitoring further includes listening to loading-proximate ambient audio during the multiple stages of loading and/or visually observing a loading-proximate area during the multiple stages of loading.

4. The method of claim 3, wherein the detecting of the distressed condition includes:

recognizing one or more sounds of distress from the power-assisted loading system; and in response to the recognizing of the one or more sounds of distress, indicating that the distressed condition exists.

5. The method of claim 4, wherein the one or more sounds of distress includes a sound of a malfunctioning mechanism within the power-assisted loading system.

6. The method of claim 3, wherein the detecting of the distressed condition includes:

recognizing one or more visual signs of distress of the power-assisted loading system; and in response to the recognizing of the one or more visual signs of distress, indicating that the distressed condition exists.

7. The method of claim 6, wherein the one or more visual signs of distress include one or more of a visual of a malfunctioning mechanism of the power-assisted loading system, a visual rapid and repetitive motion in the power-assisted loading system, and a visual shaking of the vehicle.

8. The method of claim 1, further comprising:

delivering the message to an occupant of the vehicle.

9. The method of claim 1, wherein the facilitating of the troubleshooting of the power-assisted loading system further includes one of more of performing diagnostics on the power-assisted loading system, contacting nearby assistance, contacting emergency services, resetting components of the vehicle, resetting the vehicle, sounding alarms, flashing lights, and broadcasting a distress message.

10. A non-transitory machine-readable storage medium encoded with instructions executable by one or more processors that, when executed, direct one or more processors to perform operations comprising:

controlling a loading of cargo with a power-assisted loading system from a to-be-loaded position outside a vehicle to inside the vehicle, wherein the vehicle includes a powered tailgate, and the power-assisted loading system includes a flat sliding panel and a scissor lift;

monitoring the loading of the cargo into the vehicle with a plurality of sensors coupled to a computer, wherein the monitoring includes:

measuring multiple durations of multiple stages of the loading; and the multiple stages include opening the powered tailgate, moving the flat sliding panel outward from the vehicle, lowering the scissor lift, capturing the cargo in the scissor lift, raising the cargo with scissor lift, retracting the flat sliding panel into the vehicle, and closing the powered tailgate;

detecting a distressed condition during one or more of the multiple stages of the power-assisted loading system;

in response to the detecting of the distressed condition, notifying automatically a remote communications center remote from the vehicle of the detection of the distressed condition;

receiving a message from the remote communications center in response to the notifying; and facilitating troubleshooting of the power-assisted loading system with the computer based on the message.

11. The non-transitory machine-readable storage medium of claim 10, wherein the operations further comprise;

associating a triggering threshold of duration with each of the multiple stages of the loading, wherein the detecting of the distressed condition includes:

comparing the multiple durations of the multiple stages of loading to their associated triggering threshold of duration;

determining that the duration of at least one of the multiple stages of loading exceeds its associated triggering threshold of duration; and in response to the determining that the duration of the at least one of the multiple stages of loading exceeds its associated triggering threshold, indicating that the distressed condition exists.

12. The non-transitory machine-readable storage medium of claim 10, wherein the monitoring further includes listening to loading-proximate ambient audio during the multiple stages of loading and/or visually observing a loading-proximate area during the multiple stages of loading.

13. The non-transitory machine-readable storage medium of claim 10, wherein the message received from the remote communication center is one or more of a short message service communication, an electronic data communication, and telephony communication.

14. The non-transitory machine-readable storage medium of claim 10, wherein the facilitating of the troubleshooting of the power-assisted loading system includes one or more of performing diagnostics on the power-assisted loading system, contacting nearby human assistance, contacting emergency services, resetting components of the vehicle, resetting the vehicle, sounding alarms, flashing lights, and broadcasting a distress message.

15. A method of loading cargo comprising:

loading the cargo with a power-assisted loading system from a to-be-loaded position outside a vehicle to inside the vehicle, wherein the vehicle includes a powered tailgate, and the power-assisted loading system includes a flat sliding panel and a scissor lift;

monitoring the loading of the cargo into the vehicle with a plurality of sensors coupled to a computer, wherein:

the monitoring includes: measuring multiple durations of multiple stages of the loading; and the multiple stages include opening the powered tailgate, moving the flat sliding panel outward from the vehicle, lowering the scissor lift, capturing the cargo in the scissor lift, raising the cargo with scissor lift, retracting the flat sliding panel into the vehicle, and closing the powered tailgate;

associating a triggering threshold of duration with each of the multiple stages of the loading in the computer;

detecting a distressed condition during one or more of the multiple stages of the power-assisted loading system with the computer;

in response to the detecting of the distressed condition, notifying a remote communications center remote from the vehicle of the detection of the distressed condition;

receiving a message from the remote communications center in response to the notifying; and facilitating assistance of an occupant of the vehicle based on the message.

16. The method of claim 15, wherein the detecting of the distressed condition includes:

comparing multiple durations of multiple stages of the loading to their associated triggering threshold of duration;

determining that the duration of at least one of the loading stages exceeds its associated triggering threshold; and in response to the determining that the duration of at least one of the multiple stages of loading exceeds its associated triggering threshold of duration, indicating that the distressed condition exists.

17. The method of claim 15, wherein the monitoring further includes:

listening to loading-proximate ambient audio during the multiple stages of loading; and listening to one or more sounds of distress that include at least one of a human voice requesting assistance, a human voice expressing pain or distress, a sound of a malfunctioning mechanism, a pounding on the vehicle, and a repetitive, high-pitched, or loud volume utterance from a human.

18. The method of claim 15, wherein the monitoring further includes:

visually observing a loading-proximate area during the multiple stages of loading; and visually observing one or more visual signs of distress that include at least one of a human expressing pain or distress, a visual of a malfunctioning mechanism of the power-assisted loading system, a rapid and repetitive motion in the power-assisted loading system, and a visual shaking of the vehicle.

19. The method of claim 15, wherein the message received from the remote communication center includes at least one of a short message service communication, an electronic data communication, an audio voice communication, and telephony communication.

20. The method of claim 15, wherein the facilitating of the assistance of the occupant includes one of more of performing diagnostics, interrogating the occupant, troubleshooting a malfunctioning mechanism on the power-assisted loading system, contacting nearby human assistance, contacting emergency services, directing to reset components of the vehicle, directing to reset the vehicle, sounding alarms, flashing lights, and broadcasting a distress message.

* * * * *